US007912636B2

(12) United States Patent
Shimizu

(10) Patent No.: US 7,912,636 B2
(45) Date of Patent: Mar. 22, 2011

(54) APPARATUS AND PROGRAM FOR NAVIGATION

(75) Inventor: Yasuhiro Shimizu, Tokoname (JP)

(73) Assignee: DENSO CORPORATION, Kariya (JP)

( * ) Notice: Subject to any disclaimer, the term of this patent is extended or adjusted under 35 U.S.C. 154(b) by 724 days.

(21) Appl. No.: 11/984,578

(22) Filed: Nov. 20, 2007

(65) Prior Publication Data

US 2008/0140312 A1 Jun. 12, 2008

(30) Foreign Application Priority Data

Dec. 8, 2006 (JP) ................................ 2006-331951

(51) Int. Cl.
*G01C 21/30* (2006.01)

(52) U.S. Cl. .............. 701/209; 340/995.12; 340/995.15; 701/210; 701/208; 701/211; 701/213

(58) Field of Classification Search .................. 701/209, 701/201, 210, 213, 208, 211; 340/995.15, 340/995.16
See application file for complete search history.

(56) References Cited

U.S. PATENT DOCUMENTS 6,347,280 B1 * 2/2002 Inoue et al. .................. 701/211
7,610,146 B2 * 10/2009 Breed .......................... 701/207
2004/0066330 A1 * 4/2004 Knockeart et al. ....... 342/357.07
2006/0178826 A1 8/2006 Gomi
2006/0259237 A1 11/2006 de Silva et al.

FOREIGN PATENT DOCUMENTS

EP 1 798 522 A1 6/2007
JP A-8-35850 2/1996
JP A-9-222329 8/1997
JP A-11-296791 10/1999
JP A-2006-86833 3/2006
WO WO 2006/132522 12/2006
WO WO 2007/092817 8/2007

OTHER PUBLICATIONS

Office Action mailed issued from the German Patent Office on Dec. 17, 2009 in the corresponding German patent application No. 10 2007 057 989.8-54 (with English translation).
Search Report dated Mar. 18, 2008 in corresponding Great Britain Patent Application No. GB0723730.8.

* cited by examiner

*Primary Examiner* — Thomas G Black
*Assistant Examiner* — Marthe Marc Coleman
(74) *Attorney, Agent, or Firm* — Posz Law Group, PLC

(57) ABSTRACT

A navigation apparatus displays a trend of house number increase or house number decrease when a vehicle is traveling on a street from one intersection to another intersection. By displaying the trend of the house number increase or the house number decrease as a clue of currently traveling position of the vehicle, the navigation apparatus makes it possible for a driver of the vehicle to easily understand where the driver is going and/or where the driver is traveling.

8 Claims, 6 Drawing Sheets

HOUSE NUMBER DISPLAY PROCESS 2
IDENTIFY CURRENT LINK S210
CHANGE OF LINK? S220
NO
YES
ACQUIRE TRAVEL SPEED S230
DETERMINE DISPLAY METHOD S240
DISPLAY HOUSE NUMBER S250

FIG. 2
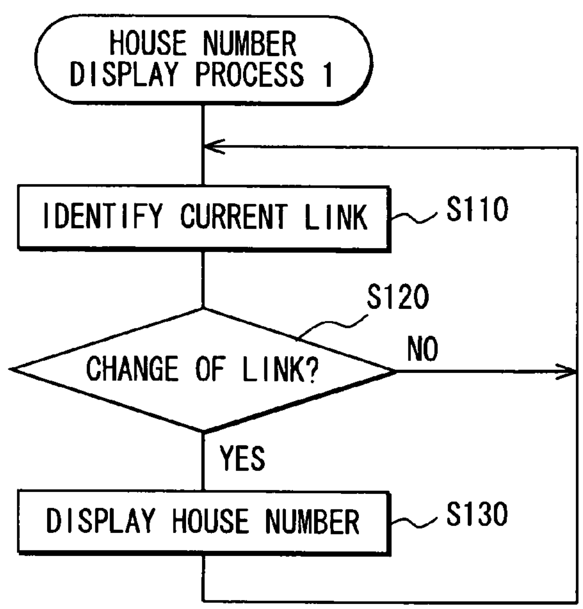
FIG. 3A
| LINK NO. | START NODE | END NODE | START H NO. | END H NO. | ROAD TYPE |
|---|---|---|---|---|---|
| L10005 | N10053 | N10054 | 1800 | 1700 | LOCAL |
| L10006 | N10054 | N10053 | 2700 | 2800 | LOCAL |
| L10007 | N10054 | N10055 | 1700 | 1600 | LOCAL |
| L10008 | N10055 | N10054 | 2600 | 2700 | LOCAL |
. . .
FIG. 3B
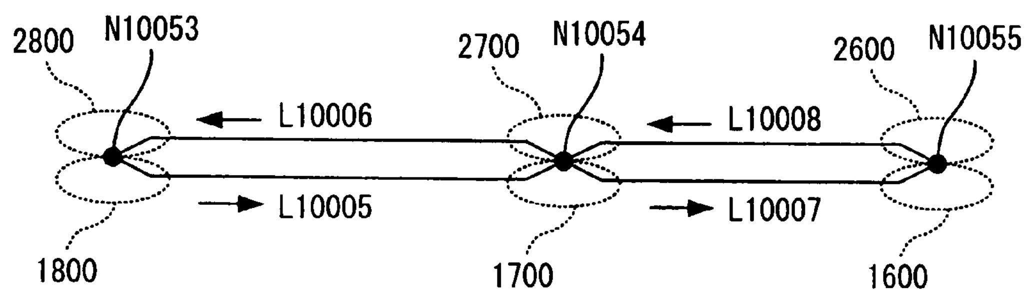

FIG. 5
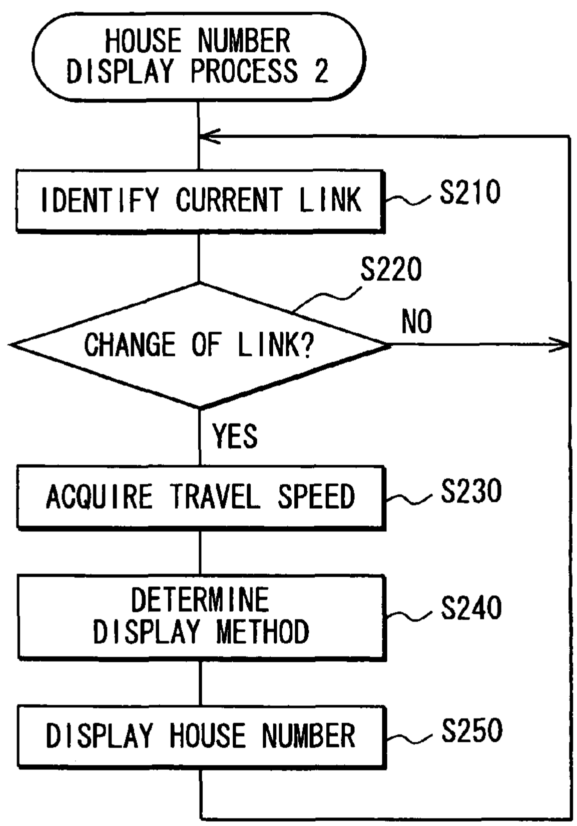
FIG. 7A
| LINK NO. | START NODE | END NODE | START H NO. | END H NO. | ROAD TYPE |
|---|---|---|---|---|---|
| L10005 | N10053 | N10054 | 1800 | 1700 | LOCAL |
| L10007 | N10054 | N10055 | 1700 | 1600 | LOCAL |
FIG. 7B
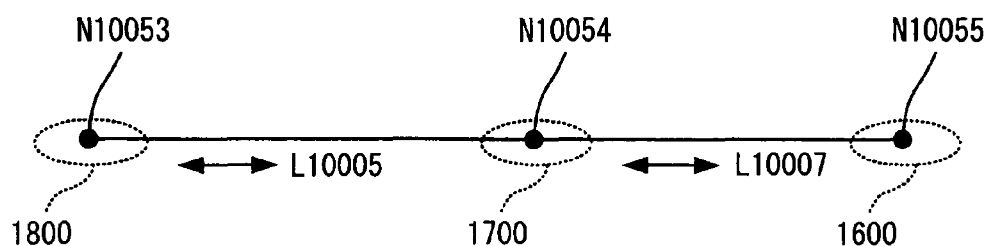

APPARATUS AND PROGRAM FOR NAVIGATION

CROSS REFERENCE TO RELATED APPLICATION

This application is based on and claims the benefit of priority of Japanese Patent Application No. 2006-331951 filed on Dec. 8, 2006, the disclosure of which is incorporated herein by reference.

FIELD OF THE DISCLOSURE

The present disclosure generally relates to an apparatus and a program for vehicle navigation.

BACKGROUND INFORMATION

Conventionally, a navigation apparatus is used for displaying a map of current vehicle position on a display unit with a vehicle position icon superposed thereon. When a user is navigated by the navigation system, the user is not always aware of a navigation route he/she is actually traveling only with a recognition of a final destination. In that case, the user may feel uncomfortable even with the current vehicle position displayed on top of the map of vicinity. For example, the uncertainty of a position currently approached, the uncertainty of a road currently traveling and/or whether the currently traveling road is the one that is notified in advance may cause uncomfortableness to the user. Japanese patent document JP-A-H09-222329 discloses and proposes a technique that displays a location name in a currently traveling direction together with the current vehicle position for enabling the user to overcome the uncomfortableness. Further, Japanese patent document JP-A-H08-35850 discloses and proposes a technique that displays a name of the currently traveling road.

However, even when the location name in the currently traveling direction and/or the currently traveling road name are displayed, there are cases that the user cannot grasp the direction of the traffic of the currently traveling road, that is, whether the vehicle is traveling up or down the street, whether the address number is increasing in the traveling direction or decreasing in the traveling direction or the like. More practically, even when the user has been told that he/she should travel a road A in a down direction, he/she does not have a clue to understand whether he/she is traveling in a correct direction on the road if he/she does not know the name of the location in the traveling direction (e.g., the location name displayed on the map).

SUMMARY OF THE DISCLOSURE

In view of the above and other problems, the present disclosure provides a navigation apparatus that enables a user to grasp the direction of the traffic on a currently traveling road.

The navigation apparatus in the disclosure includes a position determination information acquisition unit, a road information acquisition unit, a notification unit, and a control unit. More practically, the position determination information acquisition unit acquires position determination information required for determining a current position; the road information acquisition unit acquires road information required for determining a traffic direction of a road that has a distinction of traffic directions; the notification unit notifies various information; and the control unit determines, for notification of information on the traffic direction by the notification unit, the traffic direction of the road by determining a currently traveling road that is traveled by the vehicle based on the position determination information acquired by the position determination information acquisition unit and the road information acquired by the road information acquisition unit.

By using the navigation apparatus described above, the user, or the driver of the vehicle, securely understands a traveling direction on the currently traveling road due to provision of the notification of the traveling direction of the currently traveling road.

BRIEF DESCRIPTION OF THE DRAWINGS

Other objects, features and advantages of the present invention will become more apparent from the following detailed description made with reference to the accompanying drawings, in which:

FIG. 2 shows a flowchart of a house number display process 1;

FIGS. 3A and 3B show diagrams of link data in a table format and in a schematic format in the first and second embodiment of the present disclosure;

FIG. 5 shows a flowchart of a house number display process 2;

FIGS. 7A and 7B show diagrams of link data in a table format and in a schematic format in a third embodiment of the present disclosure.

DETAILED DESCRIPTION

Figure 1:
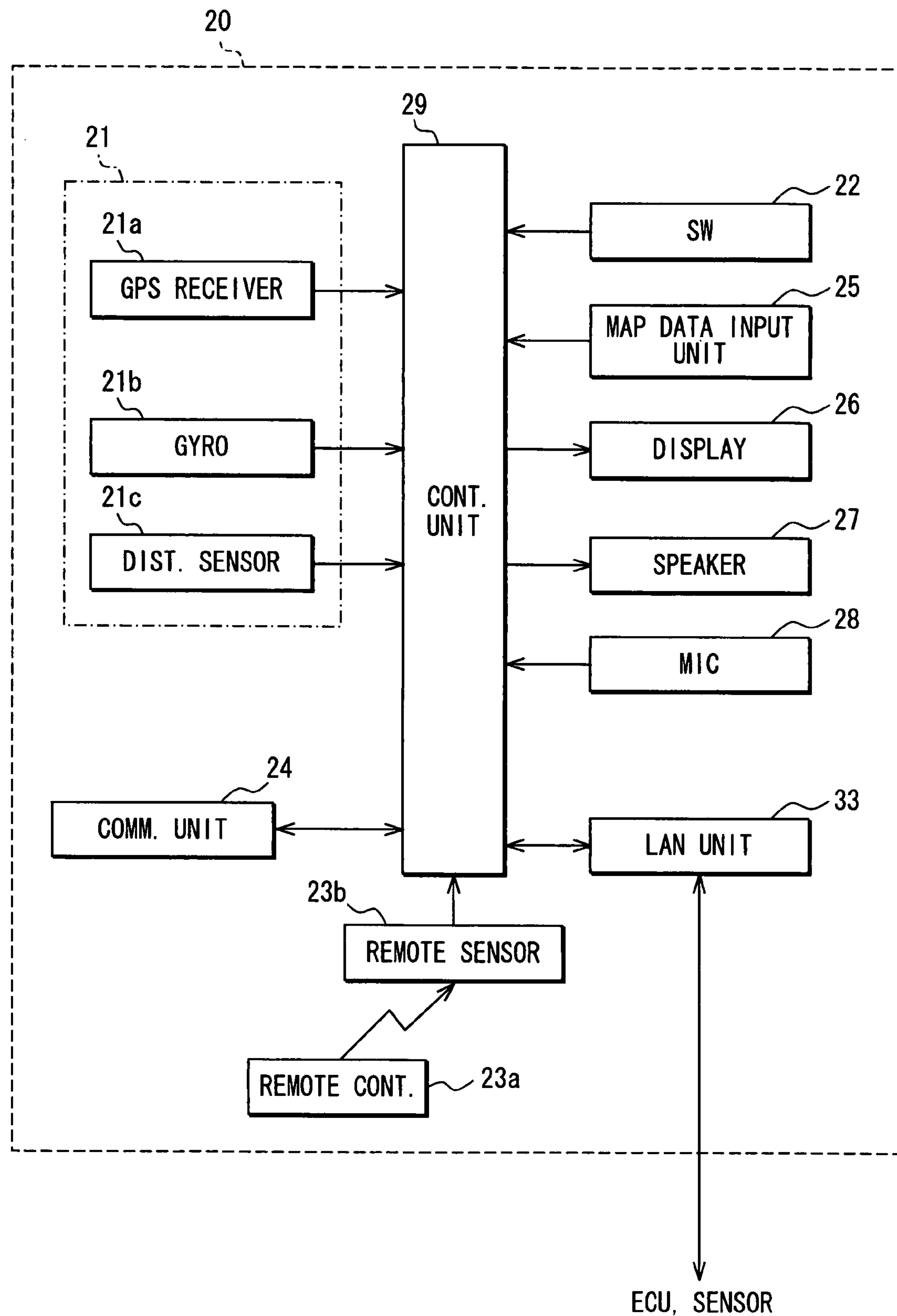
FIG. 1 shows a block diagram of a navigation apparatus in a first embodiment of the present disclosure.

The embodiment which the present invention is applied to is described with reference to the drawing.

FIG. 1 is a block diagram showing an outline configuration of a navigation apparatus 20 in a first embodiment of the present disclosure.

The navigation apparatus 20 is installed on a vehicle, and includes various components as described in the following. That is, a vehicle position sensor 21 for detecting a current position of the vehicle, operation switch group 22 for inputting various instructions from a user, a remote control terminal (a remote controller hereinafter) 23*a* for inputting various instructions in the same manner as the switch group 22 and being provided as a separated part from the navigation apparatus 20, a remote controller sensor 23*b* for detecting inputting a signal from the remote controller 23*a*, an external communication unit 24 for conducting communication with external network by connecting to a packet communication network or the like, a map data input unit 25 for data input from map memory medium that stores map data, sound data and the like, a display unit 26 for displaying various information and maps, a sound output unit 27 for outputting various guide sound and the like, a microphone 28 for outputting an electrical signal based on the sound that is uttered by a user, a vehicle LAN communication unit 33 for communicating with various ECUs on a vehicle LAN and the like, and a control unit 29 for performing various processes and for controlling the external communication unit 24, the display unit 26, the sound output unit 27, and the vehicle LAN communication unit 33 based on an input from the position sensor 21, the operation switch group 22, the remote controller sensor 23*b*, the communication unit 24, the map data input unit 25, the microphone 28, and the vehicle LAN communication unit 33 are included.

The position sensor 21 includes the following parts as its components. That is, a GPS receiver 21*a* for receiving a radio signal from GPS satellites through the GPS antenna (not illustrated) and for outputting the signal, a gyroscope 21*b* for detecting a magnitude of rotary motion of the vehicle, and a distance sensor 21*c* for detecting a travel distance based on an acceleration in an anteroposterior direction of the vehicle and the like are included. Based on the output signal from each of these sensors 21*a*-21*c*, the position, direction, speed and the like of the vehicle are calculated. In addition, the current position of the vehicle can be calculated by various methods based on the output signals from the GPS receiver. That is, the calculation method may be the point positioning method, or may be the relative positioning method.

The operation switch group 22 consists of mechanical key switches around the display unit 26 as well as a touch panel that is integrally formed as a display surface of the display unit 26. In addition, the touch panel and the display unit 26 is integrally layered, and the touch panel is activated by using any of the various methods such as a pressure sensing method, an electromagnetic induction method, a capacitance method or the combination of these methods for receiving inputs from the user.

The remote controller 23*a* has plural buttons, and is configured to transfer, to the remote controller sensor 23*b*, a signal according to the button type through the short distance wireless communication such as infrared rays.

The remote controller sensor 23*b* receives a signal from the remote controller 23*a*, and the received signal is output to the control unit 29. The external communication unit 24 acquires, from VICS information center (traffic information service in JAPAN), accident information, traffic congestion information and the like through a light beacon or a radio beacon installed on the roadside.

The map data input unit 25 is a device to input memorized various data from a map data memory medium such as, for example, a hard disk or a DVD-ROM (not illustrated). On the map data memory medium, map data (node data, link data, cost data, background data, road data, name data, mark data, crossing data, facility data and the like) as well as audio data for guidance, sound recognition data and the like are memorized. Instead of inputting these data from the map data memory medium, these data may be obtained through a communication network.

The display unit 26 has a liquid crystal display, an organic electroluminescence display or the like as a display device, and displays, on a display screen, a present vehicle location mark based on a vehicle position detected by the position sensor 21 and the map data from the map data input unit 25 as well as the navigation course to the destination, names, landmarks, various facility marks and the like in a super-positioned manner. In addition, the guides of the facilities can also be displayed.

The microphone 28 outputs an electrical signal (i.e., a voice signal) based on the input sound (i.e., utterance of the user) to the control unit 29. The user can operate the navigation apparatus 20 by inputting various sounds into this microphone 28.

The vehicle LAN communication unit 33 performs communication with various ECUs (an engine ECU, an AT-ECU, a brake ECU and the like) and various sensors (a blinker sensor, a door opening and shutting sensor and the like) connected to the vehicle LAN.

The control unit 29 consists substantially of a well-known type microcomputer having a CPU, a ROM, a RAM, an SRAM, an I/O and a bus line connecting these components together with other parts for performing various processes based on a program memorized in the ROM and the RAM. For example, the current position of the vehicle is calculated as a combination of coordinates and the travel direction based on each of the detecting signals from the position sensor 21. Further, by the control unit 29, a current location display process to display maps of current position neighborhood which is retrieved through the map data input unit 25 to the display unit 26, a route calculation process which calculates a course from the current location to the destination according to the map data stored in the map data input unit 25 and according to the operation of the operation switch group 22 or the remote controller 23*a* and a route guidance process which guides the driver along the calculated course by displaying the calculated course on the display unit 26 or by outputting the guidance sound from the sound output unit 27 are respectively performed.

A house number display process 1 that the control unit 29 carries out is described with reference to a flowchart in FIG. 2 next. As for the house number display process 1, an execution of the process is started when a map of the neighborhood of the current position is displayed on the display unit 26 in the present location display process, the route guidance process or the like. Description is omitted regarding the processes of the conventional navigation systems such as, for example, the current location display process, the route calculation process, the route guidance process and the like.

When the control unit 29 starts execution of the house number display process 1, a current link is identified (S110). This step calculates a current position based on a signal from the position sensor 21, and then identifies a link corresponding to the current vehicle position based on the map data that is input into from the map data memory medium through the map data input unit 25. It goes without saying that a technology of map matching may be employed in this case.

Then, whether the identified link has changed and whether the jurisdiction of the current position has changed are determined (S120). Whether the link has changed is determined by examining whether the identified link in a previous execution of step S110 is different from the link identified in the current execution of step S110. Whether the jurisdiction has changed is determined by examining whether the jurisdiction where the vehicle was existing in the previous execution of step S110 is different from the jurisdiction where the vehicle is existing in the current execution of step S110. In this case, the "jurisdiction" means a country, a state, a province, a city, a town, a village or the like. When the link or the jurisdiction is determined to have changed (S120:Yes), the process proceeds to S130. When the link and the jurisdiction have not determined to have changed (S120:No), the process returns to S110.

In S130 that comes after the determination that the link or the jurisdiction has changed, a house number that is associated with the link identified in S110 is acquired by referring to a link data table, and the acquired link is displayed on the display unit 26. Then, the process returns to S110.

The link data table is described with reference to FIGS. 3A and 3B. FIG. 3A is a table layout illustration of the link data table, and FIG. 3B is an illustration which shows the relationship of each data constituting a record (link data) in the link data table. The link data table is a table memorized on the map data memory medium, and the link data (each record) of the link data table consists at least of a link number, a start node number, an end node number, a start house number, an end house number, and a road type.

The link number is a number to uniquely identify the link. The start node number is a number of the node that exists on an upstream side of the travel direction among the nodes on both ends of a certain link. The end node number is a number of the node to be located on the downstream side of the travel direction among the nodes on both ends of a certain link. The start house number is a house number in a proximity of the link edge on the upstream side of the travel direction among link edges. The end house number is a house number in a proximity of the link edge on the downstream side of the travel direction among link edges. The road type is information representing the road type (a local road, an expressway and the like) of the road corresponding to the link. In the link data table used in the present embodiment, each travel direction has a dedicated link. That is, for example, the link with the link number L10006 and the link with the link number L10005 are respectively corresponding to two different roads (two roads having respectively different travel directions) that are separated from each other by a center line, a median or the like.

Two examples are described with reference to FIGS. 4A and 4B next. The house number is preferably displayed by a display method according to the preference of the user.

Figure 4A:
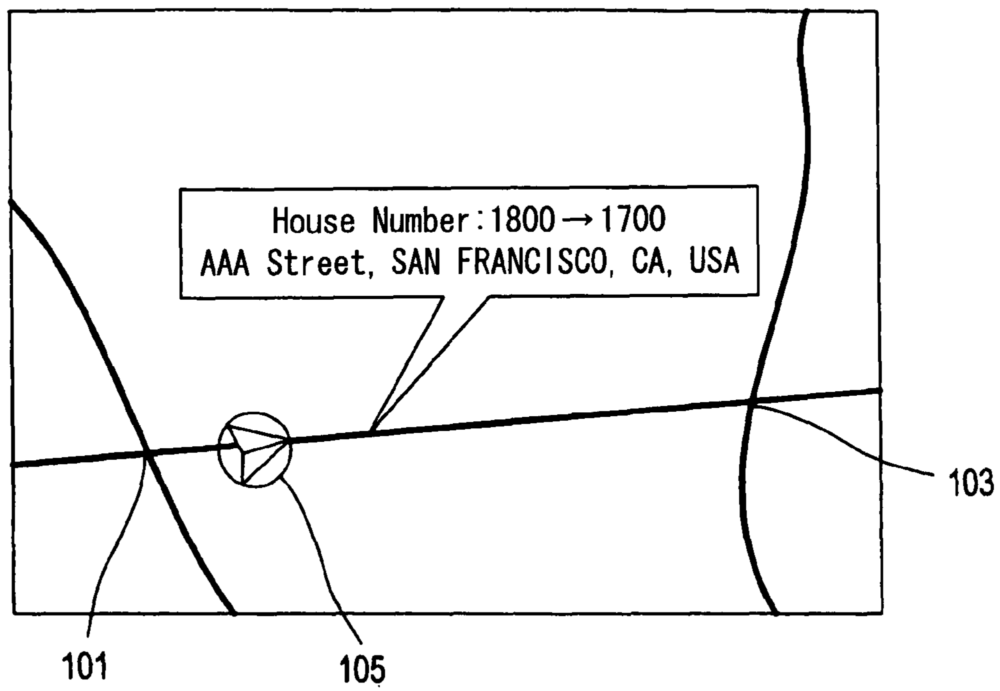
FIGS. 4A and 4B show illustrations of house number displays according to the house number display process 1.

FIG. 4A shows the first example of the house number display. In a situation that a subject vehicle 105 is traveling to a crossing 103 from a crossing 101, the message regarding the road between the crossing 101 and the crossing 103 on the screen notifies that the house number is changing along the current travel direction. In this case, a road name ("AAA Street") and a city name ("SAN FRANCISCO") as well as a state name ("CA") and the name of a country ("USA") are also displayed.

Figure 4B:
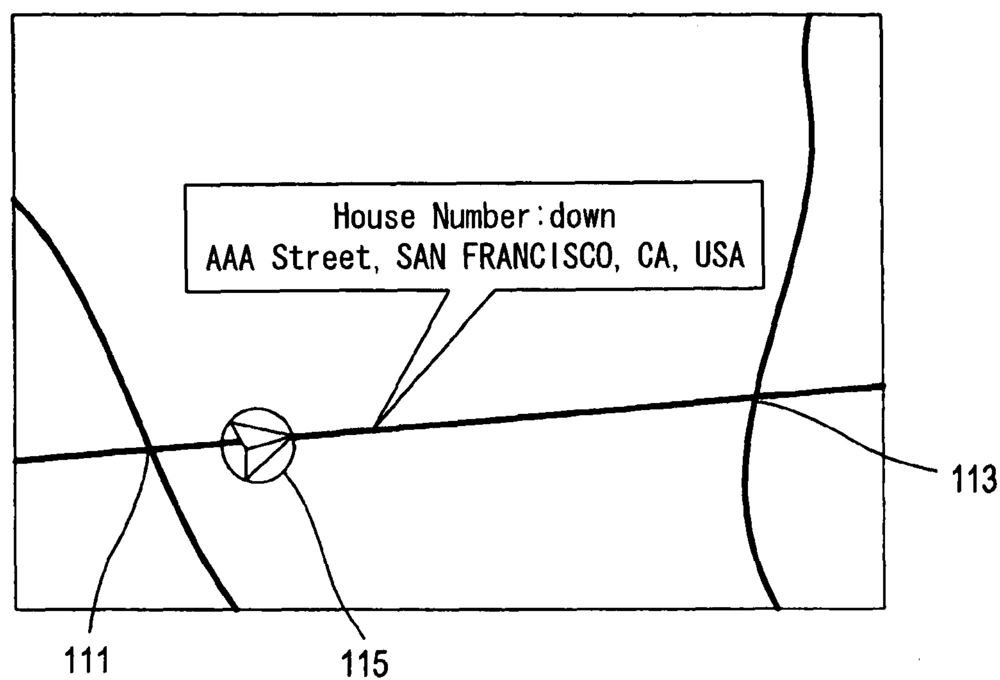

FIG. 4B shows the second example of the house number display. In a situation that a subject vehicle 115 is traveling to a crossing 113 from a crossing 111, the message regarding the road between the crossing 111 and the crossing 113 on the screen notifies that the house number is "down" (i.e., decreasing) along the current travel direction. In this case, too, the road name ("AAA Street") and the city name ("SAN FRANCISCO") as well as the state name ("CA") and the name of the country ("USA") are displayed.

As shown in the above examples, the navigation apparatus 20 displays, on the display unit 26, the increase and decrease of the house number (e.g., "down") or the arrangement of the house number (e.g., "1800→1700"). Therefore, the driver of the vehicle can recognize the traffic direction of the currently traveling road by referring to the house number.

Displaying the increase/decrease of the house number is especially advantageous for the driver who is traveling on the road that includes the destination of the travel. This is because the destination house number of, for example, 1250 which is known by the driver is considered to be easily reached by continuing the travel in the current direction when the driver is provided by information that the address number (the house number) is increasing along the traffic direction of the currently traveling road besides seeing a roadside sign that tells the house number of the current position is 1100.

Further, when the arrangement of the house number is displayed, the driver can easily understand that the vehicle is approaching the destination house number even when the house number of the current position is not provided.

A second embodiment is described in the following with a focus of explanation concentrated on differences from the first embodiment.

The configuration of the second embodiment is similar to the one in the first embodiment.

A house number display process 2 that the control unit 29 carries out is described in the following with a flowchart in the FIG. 5. When a map of the neighborhood of the current position is displayed on the display unit 26 in the current location display process or in the route guidance process, execution of the house number display process 2 is started.

When the control unit 29 starts execution of the house number display process 2, the traveling link is identified first (S210). This step calculates a current position based on a signal from the position sensor 21, and the link existing at the identified current position is determined based on the map data which is input from the map data memory medium through the map data input unit 25. It goes without saying that the technique of the map matching may be employed in this case.

Then, whether the identified link or jurisdiction has changed is determined by using the same method in the first embodiment (S220). The process proceeds to S230 when the link/jurisdiction has changed (S220:YES), or the process returns to S210 when there is no change (S220:NO).

In S230 that comes after the link/jurisdiction change, the travel speed of the vehicle is acquired. The travel speed is acquired from a speed sensor (not illustrated) through the vehicle LAN communication unit 33.

Then, the display method of the house number set in conjunction with a link is determined (S240). Determination of the display method of the house number indicates that determining information to change the interval of the house number to be displayed according to the traveling speed of the vehicle. More practically, determining the number of divisions between the starting house number and the ending house number is determined according to the traveling speed. For example, when the starting house number is 1800 and the ending house number is 1700 in the link that corresponds to the traveling road, the house number is displayed as "1800→1700" without divisions if the speed is equal to or greater than 40 km/h. On the other hand, if the speed is under 40 km/h, the number of divisions is determined as 2, the house numbers 1800-1700 is divided into two, and either of "1800-1750" or "1750-1700" is displayed depending on the position of the vehicle. The example of house number display screen is described later.

When the display method (the number of divisions) is determined, the house number is displayed by the determined display method (by using the determined number of divisions) (S250). More practically, the house numbers (the starting/ending house numbers) in association with the identified link in S210 are acquired by referring to the link data table. Then, the range of the house numbers is determined by using the house number division number as described above, and the house numbers are displayed on the display unit 26. Displaying which of the divided ranges is determined based on the information of the current position of the vehicle. Then, the process returns to S210.

Figure 6A:
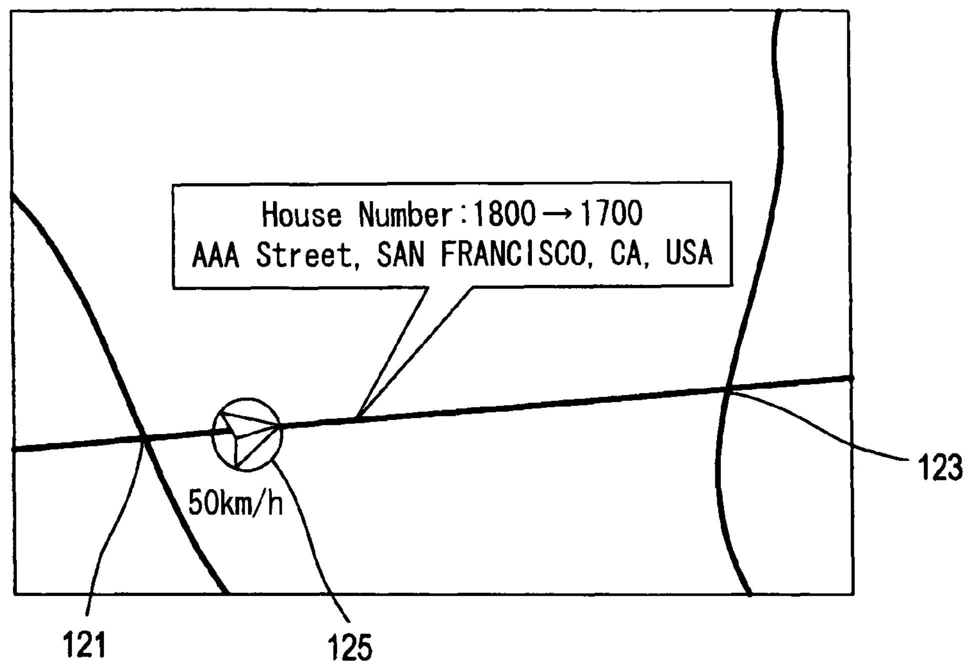
FIGS. 6A to 6B show illustrations of house number displays according to the house number display process 2.

Two examples of the display method are described with reference to FIGS. 6A and 6B. The display method of the house number is determined according to the travel speed of the vehicle (S240). FIG. 6A shows the third example of the house number display. In the situation that the a subject vehicle 125 is traveling to a crossing 123 from a crossing 121, the message on the screen indicates that the house number changes from 1800 to 1700 along the travel direction on the currently traveling road between the crossings 121 and 123. The message also indicates that the road name ("AAA Street"), the city name ("SAN FRANCISCO") and the state name ("CA") as well as the name of the country ("USA"). In addition, the travel speed ("50 km/h") is displayed under an icon of the subject vehicle 125.

Figure 6B:
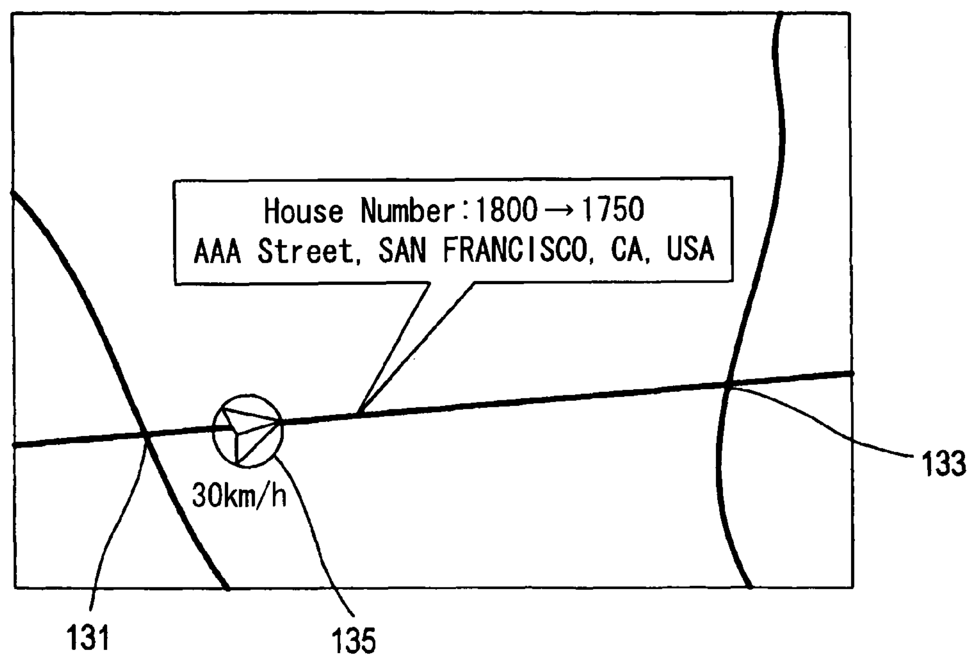

FIG. 6B shows the fourth example of the house number display. In the situation that a subject vehicle 135 travels from a crossing 133 from a crossing 131, the message on the screen indicates that the house number changes from 1800 to 1750 along the travel direction on the currently traveling road between the crossings 131 and 133. The message also indicates that the road name ("AAA Street"), the city name ("SAN FRANCISCO") and the state name ("CA") as well as the name of the country ("USA"). In addition, the travel speed ("30 km/h") is displayed under an icon of the subject vehicle 135.

The house number to be displayed on the display unit 26 is configured to change according to the travel speed of the vehicle in the navigation apparatus 20 that executes the house number display process, 2. Therefore, the frequency of the change of the displayed house number operator can be reduced to a certain level, thereby allowing the driver to easily understand and the destination house number.

A third embodiment is described in the following with a focus of explanation concentrated on differences from the first embodiment.

The configuration of the third embodiment is similar to the one in the first embodiment. However, the setting method of the link data stored in the link data table is different from the first embodiment. That is, regardless of the difference of the travel directions, one common link is assigned to plural adjacent roads. FIGS. 7A and 7B are referred to for the explanation. FIG. 7A is a table layout illustration of the link data table, and the FIG. 7B is an illustration which shows the relationship of each data constituting a record (link data) in the link data table. The link data in the table has the same items as the first embodiment, that is, the items such as the link number, the start/end node number, the start/end house number, and the road type.

The link number is a number to uniquely identify the link. The start node number is a node number of one of two nodes on both ends of a certain link. The end node number is a node number of one of two nodes on both ends of the certain link. The start house number is a house number in a proximity of the link edge that is associated to the start node number. The end house number is a house number in a proximity of the link edge that is associated to the end node number. The road type is information representing the road type (a local road, an expressway and the like) of the road corresponding to the link. In the link data table used in the present embodiment, the two adjacent roads has the same link associated thereto regardless of the difference of the travel directions. For example, the two roads with respectively different travel directions divided by a center line or a median have the same single link assigned thereto. The road that does not have the center line or the median (i.e., the road without regulated travel directions) has the single link setting.

[Explanation of the Operation]

Figure 8:
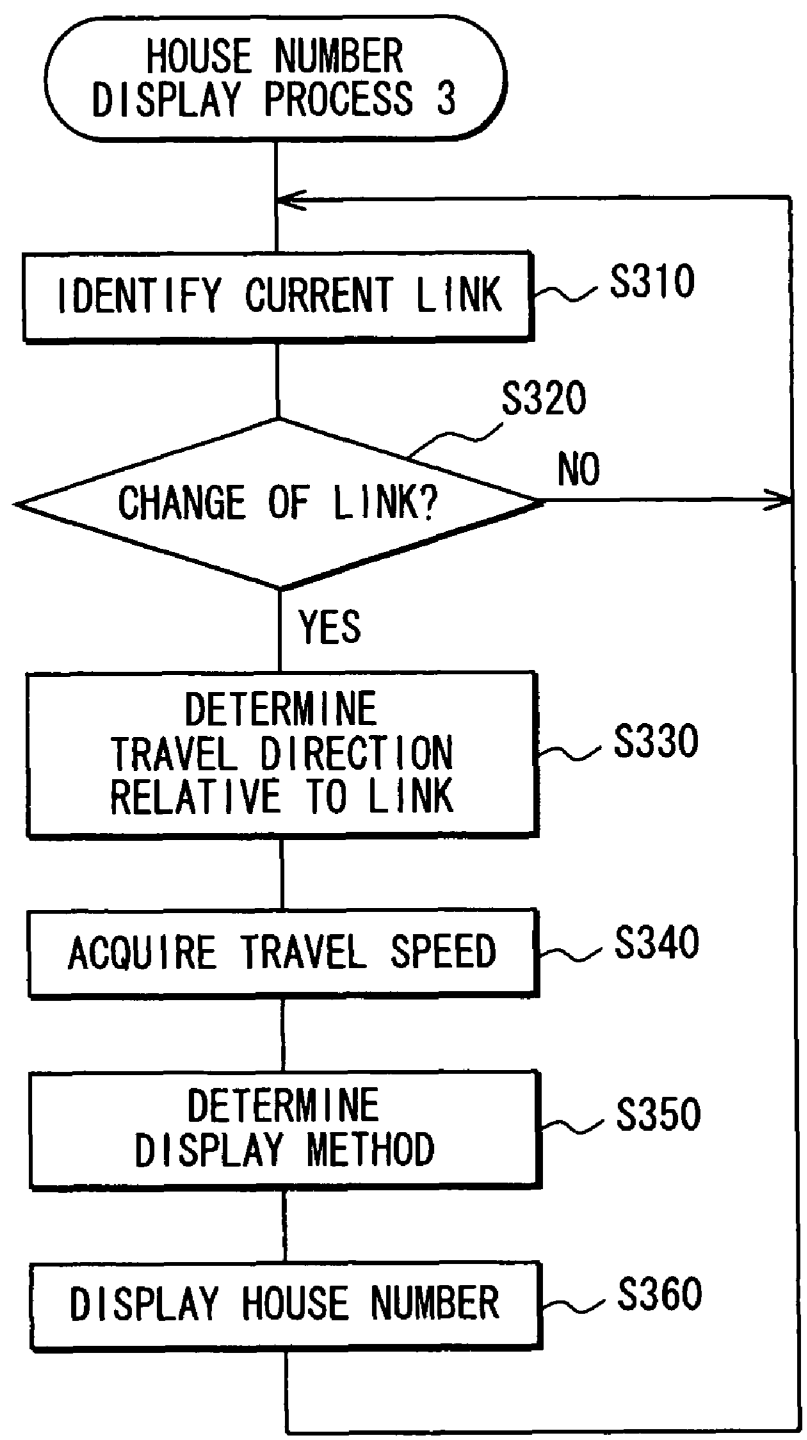
FIG. 8 shows a flowchart of a house number display process 3.

A house number display process 3 that the control unit 29 carries out next is described with a flowchart in FIG. 8 next. As for the house number display process 3, an execution of the process is started when a map of the neighborhood of the current position is displayed on the display unit 26 in the present location display process, the route guidance process or the like.

When the control unit 29 starts execution of the house number display process 3, a current link is identified (S310). This step calculates a current position based on a signal from the position sensor 21, and then identifies a link corresponding to the current vehicle position based on the map data that is input into from the map data memory medium through the map data input unit 25. It goes without saying that a technology of map matching may be employed in this case.

Then, whether the identified link has changed and whether the jurisdiction of the current position has changed are determined (S320). Whether the link has changed is determined by examining whether the identified link in a previous execution of step S310 is different from the link identified in the current execution of step S310. Whether the jurisdiction has changed is determined by examining whether the jurisdiction where the vehicle was existing in the previous execution of step S310 is different from the jurisdiction where the vehicle is existing in the current execution of step S310. In this case, the "jurisdiction" means a country, a state, a province, a city, a town, a village or the like. When the link or the jurisdiction is determined to have changed (S320:Yes), the process proceeds to S330. When the link and the jurisdiction have not determined to have changed (S320:No), the process returns to S310.

In S330 that comes after the determination that the link or the jurisdiction has changed, whether the vehicle is traveling the link in a forward direction (i.e., a direction from the start node number toward the end node number) or in a backward direction (i.e., a direction from the end node number toward the start node number) is determined. The travel direction is determined based on the transition of the current vehicle position.

Then, the travel speed is acquired in S340 in the same manner as in S230, and the house number display method is determined in S350 in the same manner as in S240. Then, the range of the house number is divided according to the travel speed in the same manner as described above. When the display method (the number of divisions) is determined, the house number is displayed by the determined display method (by using the determined number of divisions) (S360). More practically, the house numbers (the starting/ending house numbers) in association with the identified link in S310 are acquired by referring to the link data table. Then, the range of the house numbers is determined by using the house number division number as described above, and the house numbers are displayed on the display unit 26 according to the link direction identified in S330. The link direction considered in the course of displaying is that the house numbers are displayed in a progressive manner from the start house number to the end house number if the link is currently traveled in the forward direction, or the house numbers are displayed in a counter-progressive manner from the end house number to the start house number if the link is currently traveled in the backward direction. Because of the similarity to the example in the second embodiment, the display example on the display unit 26 is omitted. Then, the process returns to S310.

The navigation apparatus 20 in the present embodiment has the same advantageous effect as the one in the second embodiment. In addition, the two adjacent roads have the same link regardless of the different travel directions, thereby making the number of records in the link data table smaller in comparison to the one in the second embodiment.

Though the house number display method in the present embodiment changes according to the travel speed of the vehicle in the same manner as the second embodiment, the house number may be fixedly displayed on the display unit 26 as described in the first embodiment.

Although the present invention has been fully described in connection with the preferred embodiment thereof with reference to the accompanying drawings, it is to be noted that various changes and modifications will become apparent to those skilled in the art.

(1) In each of the above embodiments, the house number is shown in a manner "1800→1700." However, the house number may be displayed in a different manner. For example, the house number on both edges of the link together with the intermediate house number may be displayed as "1350, 1400, 1450," or all house numbers may be displayed if there are only a few house numbers corresponding to the link concerned. Further, these display methods may preferably selected arbitrarily with an operation of the switch group 22 by the driver.

(2) The house number may be output by voice from the speaker 27 instead of being displayed by an image on the display unit 26.

In this manner, the driver's attention is not distracted by watching the display unit 26 for recognizing the house number increase/decrease.

(3) The address number described in the above embodiment may be the number that is different from the house numbers. That is, for example, the number may be a land number, a telephone pole number or any other number that is used to specifically identify the position of the vehicle.

When such a number is used in substitution for the house number, the same effect derived from the navigation apparatus 20 stated above is achieved.

(4) The display timing of the house number may be controlled by the user operation instead of the link/jurisdiction change as described in the above embodiments. In this manner, the user may confirm the current vehicle position with the travel direction and the address at an appropriate timing.

Such changes and modifications are to be understood as being within the scope of the present invention as defined by the appended claims.

Correspondence of terms mentioned in the specification to terms used in claims is specified in the following. The position sensor 21 is equivalent to a position determination information acquisition unit, and the map data input unit 25 is equivalent to a road information acquisition unit, and the display unit 26 and the sound output unit 27 are equivalent to a notification unit, and the vehicle LAN communication unit 33 is equivalent to a travel speed information acquisition unit.

What is claimed is:

1. A navigation apparatus for use in a vehicle comprising:

a position determination information acquisition unit that acquires position determination information required for determining a current position;

a road information acquisition unit that acquires road information required for determining a traffic direction of a road that has a distinction of traffic directions;

a notification unit that notifies various information;

a travel speed information acquisition unit that acquires travel speed information representing a travel speed of the vehicle, and a control unit that determines, for notification of information on the traffic direction by the notification unit, the traffic direction of the road by determining a currently traveling road that is traveled by the vehicle based on the position determination information acquired by the position determination information acquisition unit and the road information acquired by the road information acquisition unit, wherein information on the traffic direction notified by the notification unit under control of the control unit is an arrangement of all or a part of address numbers in the road information, the control unit chooses the address numbers for address number notification by the notification unit, and an interval of the address numbers to be notified is determined according to the travel speed of the vehicle derived from the travel speed information acquired by the travel speed information acquisition unit.

2. The navigation apparatus of claim 1, wherein information on the traffic direction which is notified by the notification unit under control of the control unit is information on one of an increasing trend and a decreasing trend of an address number in the road information in association with the current travel direction of the vehicle.

3. The navigation apparatus of claim 1, wherein the address number is a house number.

4. The navigation apparatus of claim 1, wherein the road information is link data that associates at least two nodes with information on the traffic direction attached thereto.

5. A program product stored in a computer readable medium for operating a computer, the program product comprising an instruction of:

controlling the computer as the control unit of the navigation apparatus of claim 1.

6. The navigation apparatus of claim 1, wherein at least one of a link change and a jurisdiction change is detected based on the position determination information.

7. A navigation apparatus for use in a vehicle comprising:

a position determination information acquisition unit that acquires position determination information required for determining a current position;

a road information acquisition unit that acquires road information required for determining a traffic direction of a road that has no distinction of traffic directions;

a notification unit that notifies various information;

a travel speed information acquisition unit that acquires travel speed information representing a travel speed of the vehicle, and a control unit that determines, for notification of information on the traffic direction by the notification unit, a currently traveling road that is traveled by the vehicle based on the position determination information acquired by the position determination information acquisition unit and the road information acquired by the road information acquisition unit and determines the traffic direction of the road by detecting a position change of the vehicle, wherein information on the traffic direction notified by the notification unit under control of the control unit is an arrangement of all or a part of address numbers in the road information, the control unit chooses the address numbers for address number notification by the notification unit, and an interval of the address numbers to be notified is determined according to the travel speed of the vehicle derived from the travel speed information acquired by the travel speed information acquisition unit.

8. The navigation apparatus of claim 7, wherein at least one of a link change and a jurisdiction change is detected based on the position determination information.

* * * * *